United States Patent Office 2,986,552
Patented May 30, 1961

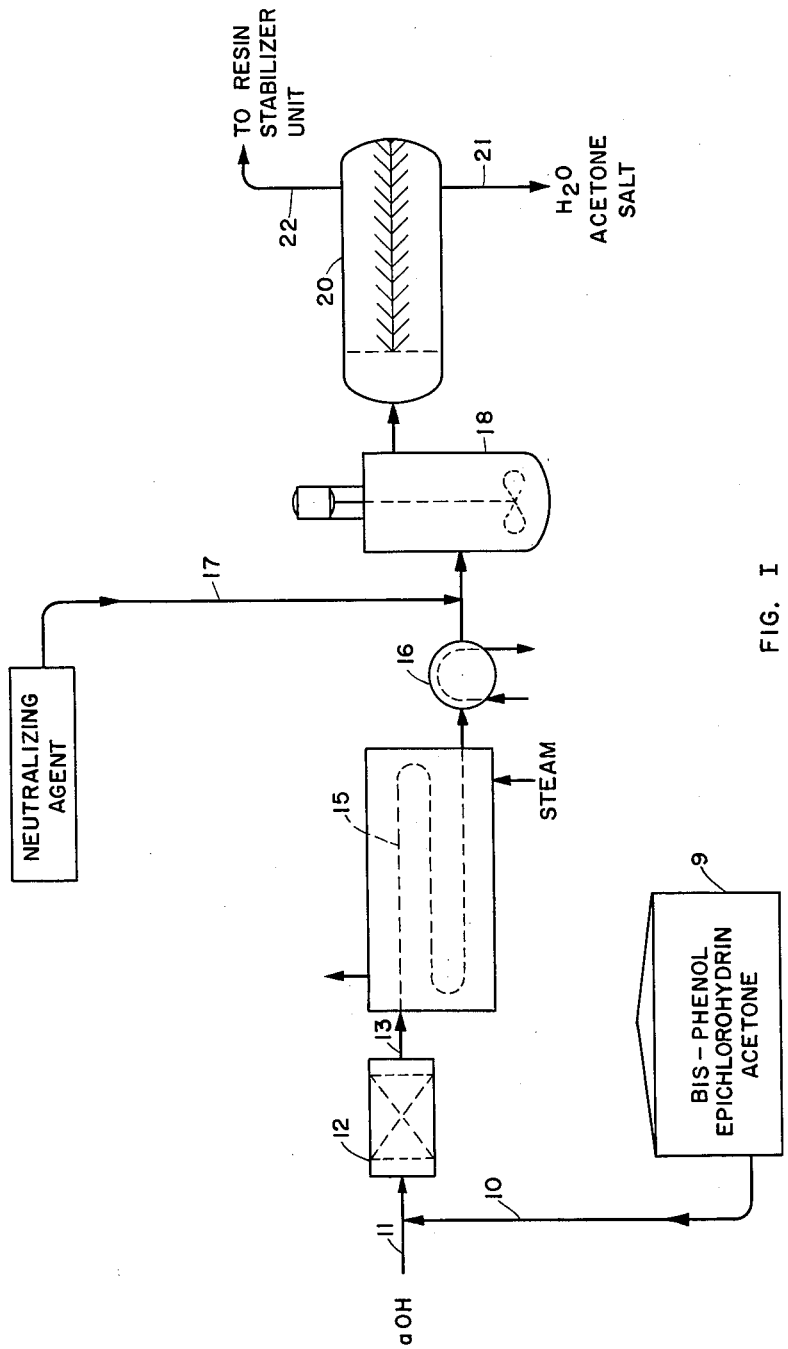
FIG. I
INVENTORS:
ALTON JOHN LANDUA
JOHN GEORGE SCHUREN
BY
THEIR AGENT

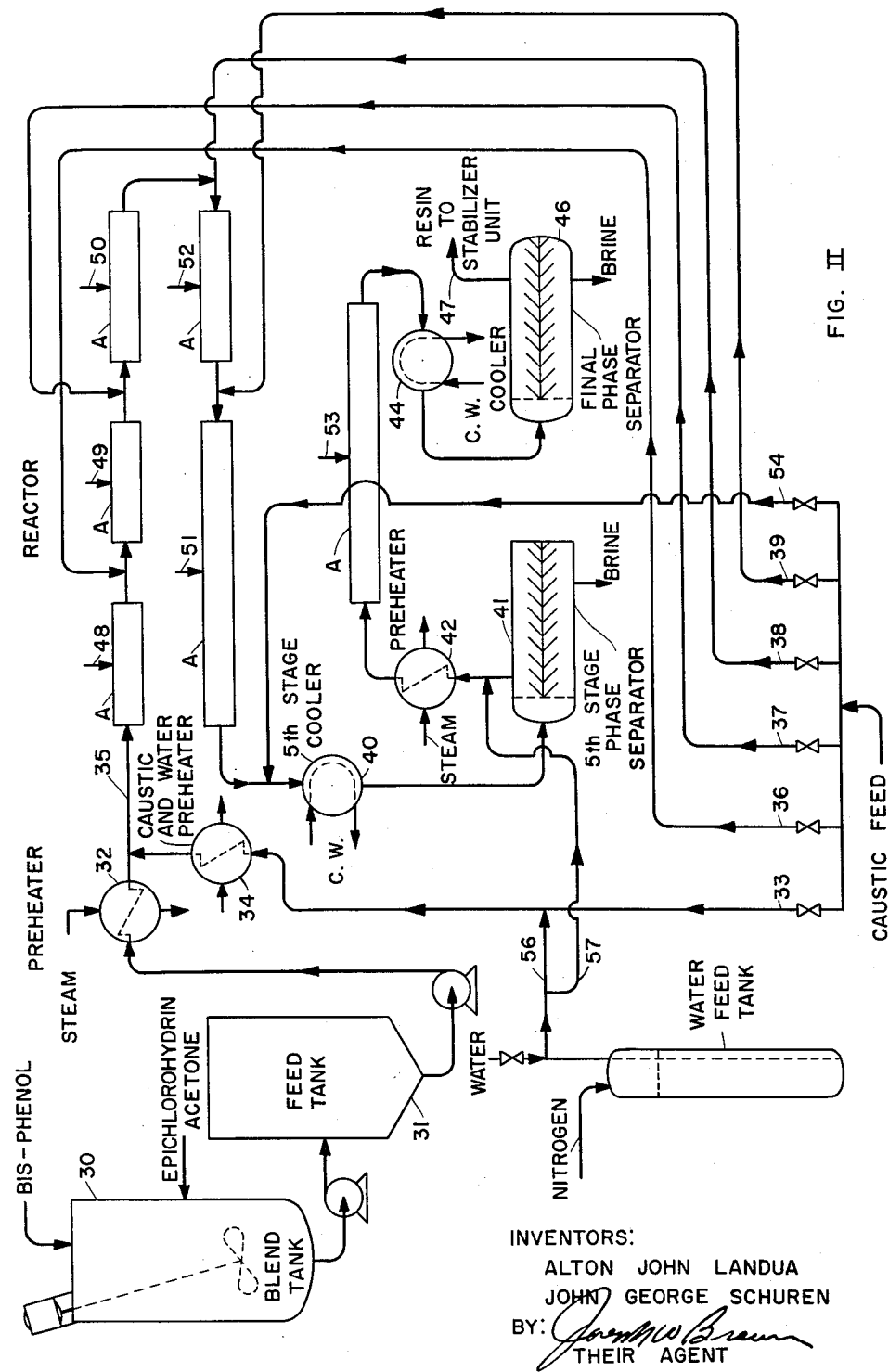
FIG. II
INVENTORS:
ALTON JOHN LANDUA
JOHN GEORGE SCHUREN
BY:
THEIR AGENT

2,986,552
CONTINUOUS PROCESS FOR PREPARING GLYCIDYL ETHERS OF PHENOLS

Alton John Landua, Bellaire, and John George Schuren, Pasadena, Tex., assignors to Shell Oil Company, a corporation of Delaware Filed Oct. 4, 1957, Ser. No. 688,359

13 Claims. (Cl. 260—47)

This invention relates to a process for preparing glycidyl ethers. More particularly, the invention relates to a new process for preparing glycidyl ethers of phenols in a continuous manner.

Specifically, the invention provides a new and highly efficient process for preparing on a continuous basis glycidyl ethers of phenols. This process comprises continuously introducing epichlorohydrin or glycerol chlorohydrin, a phenol, an aliphatic ketone containing no more than 4 carbon atoms, such as acetone, and water into an elongated reaction zone where as an intimate mixture the components are heated in the presence of an alkali metal hydroxide at a temperature giving a suitably short residence time, continuously withdrawing the reaction mixture to a phase separator, separating the organic phase and recovering the glycidyl polyether therefrom.

As a special embodiment, the invention provides a preferred method for operating the above process to form solid type glycidyl polyethers. This process comprises continuously introducing an intimate mixture containing epichlorohydrin or glycerol chlorohydrin, the phenol, acetone and water into the elongated reaction zone where it is mixed with aqueous caustic to form a mixture wherein the epichlorohydrin or glycerol chlorohydrin and polyhydride phenol are in a mol ratio of 1.05:1 to 2:1, the acetone makes up at least 30% by weight of the mixture and the water makes up at least 18% by weight of the mixture, maintaining the mixture in the zone at a temperature between 100° C. and 180° C. for a residence period of between about 5 minutes and 20 minutes, continuously removing the reaction mixture to a phase separator, separating the organic phase and recovering the glycidyl polyether therefrom.

As a further special embodiment, the invention provides a preferred method for operating the process to give liquid type glycidyl polyethers. This process comprises continuously introducing a mixture containing epichlorohydrin or glycerol chlorohydrin, polyhydric phenol, acetone and water wherein the epichlorohydrin and polyhydric phenol are in a mol ratio varying from about 8/1 to 20/1, the acetone makes up at least 30% by weight of the mixture and the water makes up about 5% by weight of the mixture, continuously passing this mixture into an elongated reaction zone which is maintained at a temperature between 100° C. and 180° C. and into which at a plurality of spaced intervals aqueous alkali metal hydroxide is being added, the residence time in the said zone being between about 1 minute and 15 minutes, continuously removing the reaction mixture to a phase separator, separating the organic phase and recovering the glycidyl polyether therefrom.

Glycidyl polyethers of polyhydric phenols (e.g. Epon 1004) are used commercially for the preparation of coating compositions and many other applications. The methods used in preparing these resins heretofore have been batch methods wherein the apichlorohydrin is combined with the polyhydric phenol and the necessary amount of sodium hydroxide added and the mixture heated to form the desired product. The mixture is then treated to remove the formed salt and the glycidyl ether recovered. This method is rather time consuming, expensive and gives slight variations in properties from batch to batch, and for commercial operations, it would be highly desirable to have a continuous method for making the resins that would avoid these difficulties.

Various attempts have been made in the past to convert the above batch processes to continuous operation, but the attempts heretofore have not been very satisfactory. Attempts to make the process continuous, for example, by merely continuously feeding in the epichlorohydrin and polyhydric phenol with continuous addition of sodium hydroxide and then continuously withdrawing the product from the reaction zone were not successful, chiefly because in the case of the liquid grade resins, the products contained large amounts of the undesirable high molecular weight materials, and in the case of the solid grade resins, operation was difficult because of the separation of solid or highly viscous materials.

Attempts have also been made to obtain a continuous process by the addition of solvents, such as ethanol and isopropyl alcohol, but the results obtained from these processes were also not satisfactory. In some cases, for example, there was reaction of the solvent to form undesirable by-products. In other cases, there was precipitation of the phenate and little reaction took place. In still other cases, the presence of the solvent made the removal of the salt more difficult, and in other cases, the recovery of the solvent was difficult and expensive.

It is an object of the invention, therefore, to provide a new process for preparing glycidyl ethers. It is a further object to provide a new process for preparing glycidyl ethers which is a true continuous process. It is a further object to provide a new process for preparing glycidyl polyethers on a continuous basis which gives good quality of resin. It is a further object to provide a new continuous process for making glycidyl polyethers which is substantially free of reaction between the solvent and reactants and/or product. It is a further object to provide a new continuous process for making glycidyl polyethers using a special solvent medium which permits easy removal and recycle of the solvent. It is a further object to provide a new continuous process for making solid grade and liquid grade resins which gives substantially the same high yield as the batch processes. Other objects and advantages of the invention will be apparent from the following detailed description thereof and from the attached drawings which represent two examples of assemblage of apparatus that might be used in operating the process of the invention. A detailed description of these drawings is given hereinafter.

It has now been discovered that these and other objects may be accomplished by the process of the invention which comprises continuously introducing epichlorohydrin or glycerol dichlorohydrin, a phenol, an aliphatic ketone containing no more than 4 carbon atoms, such as acetone, and water into an elongated reaction zone where as an intimate mixture the components are heated in the presence of an alkali metal hydroxide at a temperature above about 70° C., continuously withdrawing the reaction mixture to a phase separator, separating the organic phase and recovering the glycidyl ether therefrom. It has been found that by the use of this method one can obtain liquid and solid glycidyl ethers which are surprisingly uniform in property and are of exceptionally high quality. In addition, there is little or no by-product formation due to the reaction of the acetone and the ethers are obtained in high yield free of impurities. Further, the process permits easy removal of the salt from the ether, and the acetone can be easily separated and recycled. Finally, the yield per hour is surprisingly high and far in excess of that obtained by the most efficient operation of the batch process. These and other advantages of the process will be illustrated in the examples at the end of the specification.

In the operation of the process of the invention epichlorohydrin or glycerol chlorohydrin, a phenol, an aliphatic ketone containing no more than 4 carbon atoms, such as acetone and water are introduced into the reaction zone. These components may be added separately or in combination. It is preferred to first mix the phenol, epichlorohydrin or glycerol dichlorohydrin and acetone and then combine this mixture with water and caustic. The ratio in which the epichlorohydrin or glycerol chlorohydrin and phenol are combined will vary depending upon the type of product desired. Simple ethers of monohydric phenols are preferably obtained by reacting the phenol with an approximately equimolecular amount of the epichlorohydrin or glycerol chlorohydrin. The solid type polyethers are obtained when the amount of epichlorohydrin or glycerol chlorohydrin is small and the mol ratios generally vary from about 1.05:1 to about 2:1 or greater. The liquid resins, on the other hand, are obtained when the epichlorohydrin or glycerol chlorohydrin is used in larger excess, such as, for example, wherein the components are combined in mol ratios varying from about 5:1 to 20:1. Preferably, the liquid resins are obtained by using mol ratios varying from 10:1 to 15:1 if the product is not to be further processed. For fractionation of liquid products, one may want a product produced at 3 to 5 mole ratio.

The amount of aliphatic ketone (e.g. acetone or methyl ethyl ketone), and amount of water in the reaction mixture are of great importance and care should be exercised in selecting the right proportions. The amount of ketone in the feed mixture should be about 30% to 50% by weight of the mixture, and preferably between 30% and 38% by weight of the mixture. The amount of water should be at least 2.5% to start and should be at least 18% by weight at the end of the reaction zone. In case all of the aqueous alkali is added at the beginning as in the preferred method for making the solid grade resins as noted hereinafter, the amount of water to start is preferably at least 18% by weight. In those cases where aqueous alkali is added during the course of the reaction, smaller amounts of water, e.g. 5% to 10% may be sufficient to start.

Another component for the reaction mixture is the alkali metal hydroxide. As noted, this may be added all at the beginning as in the case of the preparation of the solid resins, or it may be added in small increments during the course of the reaction as in the case of preparation of the liquid grade resins where excess epichlorohydrin or glycerol chlorohydrin is present in the feed mixture.

The total amount of alkali metal hydroxide used in the process is an equivalent of the hydroxide per equivalent of the epichlorohydrin reacted. This amount of hydroxide is ordinarily somewhat less than the phenolic hydroxyl equivalents of the phenol fed to the reaction system. This is because the higher ether products require less than this equivalent amount of hydroxide. For example, if the product in using a dihydric phenol were exclusively the simple diether, then 2 moles of epichlorohydrin per mole of the phenol would have reacted and 2 mols of the hydroxide would be required. The next higher resin, on the other hand, result from the reaction of 3 moles of epichlorohydrin with 2 moles of the phenol so only 1.5 moles of epichlorohydrin have reacted per mole of the phenol, and consequently only 1.5 moles of the hydroxide is required. The important point is that sufficient hydroxide as a whole should be used that the ether product leaving the last reaction zone is substantially free of organically bound chlorine and that the reaction mixture is substantially neutral. If glycerol dichlorohydrin is employed as reactant, additional alkali metal hydroxide will be needed to bring about in situ formation of epichlorohydrin, e.g. an additional mol of alkali metal hydroxide per mol of dichlorohydrin.

When making the liquid resins using an excess of the epichlorohydrin, the amount of the alkali metal hydroxide will preferably vary from about 2.1 to 2.2 moles of alkali metal hydroxide per mol of dihydric phenol. When making the solid grade resins, the amount of the alkali metal hydroxide will preferably vary from about 1.2 to 2 mols of alkali per mol of dihydric phenol.

When making the liquid grade resins, the alkali is preferably added in small increments to the reaction zone itself rather than all at the beginning. It is preferably added in from 6 to 12 portions which may be equally spaced apart, but are preferably arranged in an unequal arrangement as in Figure II wherein the additions are made in about the middle of each reaction stage, the stages themselves being of unequal length.

When making the solid grade resins wherein there is no large excess of epichlorohydrin, the alkali is preferably added all at the beginning.

The alkali metal hydroxide is added as an aqueous solution and preferably as a 5% to 45% aqueous solution.

The alkali metal hydroxide is preferably sodium hydroxide but other hydroxides such as potassium or lithium hydroxide may also be used.

It should be noted that the feed mixture should be thoroughly mixed and should preferably be homogeneous in nature before being introduced into the reaction zone. This may be accomplished by rapidly mixing the components together as by the use of a high speed stirrer say at the rate of about 100 to 1000 r.p.m., or by forcing the mixture through a packed section, e.g. at a velocity of 1.2 to 4.8 ft./minute, or when used on large scale operations at a higher velocity of say 1 to 2.5 ft. per second.

The mixing is maintained in the reaction zone by use of high flow velocities, such as, for example, velocity of 0.7 to 2.5 feet per second. When the aqueous caustic is added in the reaction zone, the thorough mixing thereof with the reaction mixture is accomplished by use of such high velocity flow.

The temperature used in the reaction zone will vary from about 70° C. to about 200° C. It is generally preferred to keep temperature as high as possible in order to cut down residence time. If temperatures above the normal boiling point are used, equipment capable of holding moderate pressures is required. Preferred temperatures range from about 115° C. to 180° C. with a pressure above about 100 p.s.i.g.

The components to be added to the reaction zone may be preheated if desired before introduction. Preheated temperatures generally vary from 5 to 20° C. below temperatures in the reaction zone.

The residence time will vary from about 1 minute up to about 20 minutes. In the case of the liquid resins wherein one uses an excess of epichlorohydrin and injects caustic along the reaction zone, residence time generally varies from about 1 to 10 minutes. In the case of the solid grade resins, residence times generally vary from about 5 minutes to 20 minutes.

The mixture recovered from the reaction zone is allowed to separate into an organic phase which contains the glycidyl polyether, acetone, and excess epichlorohydrin and an aqueous phase which contains predominantly water and salt.

In a preferred operation of the process, an additional phase separator is introduced preferably before the last one or two stage additions of caustic. The removal of the aqueous phase at this point has been found to be helpful in lowering the saponifiable chlorine and phenolic OH content of the resin with a consequent lowering of viscosity.

The final and intermediate separation or separations may be accomplished at any temperature, i.e. may be a cold or hot separation. It is generally preferred to employ hot separation in the case of the intermediate separations as this eliminates necessity of cooling and reheating. The hot separation can be conducted at any desired elevated temperature but is most conveniently conducted at the temperature of the reaction mixture without addition or removal of heat. If cold separation e.g. at 60–90° C., is employed in the intermediate separation, the mixture is then preheated as noted above. The final separation is preferably conducted at lower temperatures, e.g. at temperatures ranging from about 60° C. to 90° C.

In both types of separations, the aqueous layer is removed and may be treated to recover any acetone or epichlorohydrin or may be discarded. In the case of the intermediate separations, the brine solution may be advantageously used to wash the reaction mixture before the last and final separation.

The mixture recovered from the reaction zone may be neutralized if desired before the final separation. Neutralization may be accomplished by the addition of acidic materials, such as sodium hydrogen phosphate, hydrogen chloride and the like, preferably so as to obtain a mixture having a pH of 7–9. Neutralization is not needed in the case of the liquid resins.

The glycidyl ether may be recovered from the organic phase by any suitable means. It is preferably accomplished by distilling the mixture under vacuum and recovering the glycidyl ether as bottoms product.

To illustrate more or less diagrammatically how the novel process of the invention may be operated, reference is made to the accompanying drawings showing assemblages of apparatus for the preparation of glycidyl ethers of bis-phenol. The drawings are attched as examples only and should not be regarded as limiting the invention in any way.

Figure I represents preferred apparatus for making solid grade resin. Referring to that drawing, bis-phenol, epichlorohydrin, and acetone are combined in storage tank 9 and the mixture taken through line 10 where it is combined with aqueous sodium hydroxide entering through line 11. The two components are throughly mixed in mixer 12 by passing the mixture through a packed section. From the mixer, the combination is taken through line 13 to pipe reactor 15 which may be electrically or steam heated to a temperature between 100° C. and 180° C. After leaving the reactor, the mixture is cooled at 16A, combined with neutralizing agent introduced through line 17 and then taken to kettle 18 wherein the neutralizing agent and mixture are thoroughly stirred together. The mixture is then continuously withdrawn to separator 20 where the mixture separates into organic layer and aqueous layer. The brine solution is removed through line 21. The organic layer is removed through line 22 and taken to a stabilization unit where the acetone and water are taken off and the resin recovered as bottoms product.

Figure II represents a preferred apparatus for preparing liquid resins wherein an excess of epichlorohydrin is utilized and aqueous caustic is introduced into the reaction zone in 6 stages. The detailed operation of this process is outlined below:

The epichlorohydrin, bis-phenol and acetone are mixed in tank 30, stored in tank 31 and preheated at preheater 32. Caustic and water from lines 33 and 56 are mixed and preheated at preheater 34. The two streams are then mixed and taken to reactor A through line 35. Aqueous caustic is introduced through lines 36 to 39 and 54 as indicated. The mixture after the 5th stage addition is then cooled at cooler 40, taken to separator 41, combined with water from line 57, reheated at heater 42 and then taken to reactor A. When removed from reactor A, the mixture is taken to cooler 44 and then to phase separator 46. The product is recovered from line 47 where it is taken to a stabilizing unit.

When using a 12 stage addition of caustic, the addition introduction points 48 to 53 may be used.

Although the process of the invention is particularly suitable for continuous production of glycidyl ethers of any phenol, it is preferably used for efficient manufacture of the glycidyl ether of polyhydric phenols. Typical phenols include those having phenolic hydroxyl groups attached to non-adjacent ring carbon atoms such as resorcinol, hydroquinone, chlorohydroquinones, methyl resorcinol, phloroglucinol, 1,5-dihydroxynaphthalene, 4,4'-dihydroxydiphenyl, bis(hydroxyphenyl)methane, 1,1-bis(4-hydroxyphenyl)ethane, 1,1-bis(4-hydroxyphenyl)isobutane, 2,2-bis(4-hydroxyphenyl)propane, which is termed bis-phenol herein for convenience, 2,2-bis(2-hydroxy-4-tert-butylphenyl)propane, 2,2-bis(2-hydroxyphenyl)propane, 2,4'-dihydroxydiphenyldimethylmethane, 2,2-bis-(2-chloro-4-hydroxyphenyl)propane, 2,2-bis(2-hydroxynaphthyl)pentane, 2,2-bis(2,5-dibromo-4-hydroxyphenyl)butane, 4,4'-dihydroxybenzophenone, 1,3-bis-(4-hydroxyphenyloxy)-2-hydroxypropane, 3-hydroxyphenyl salicylate, 4-salicoylaminophenol, as well as more complex polyhydric phenols such as novolak resins obtainable by acid catalyst condensation of phenol, p-cresol, or other substituted phenols with aldehydes such as formaldehyde, acetaldehyde, crotonaldehyde, etc.; condensates of phenols with cardanol such as described in U.S. 2,317,607; condensates of phenols with aliphatic diols such as described in U.S. 2,321,620; and condensates of phenols with unsaturated fatty oils such as described in U.S. 2,031,586. The polyhydric phenols contain 2 or more phenolic hydroxyl groups in the average molecule thereof and are free of other functional groups which would interfere with formation of the desired glycidyl ethers.

To illustrate the manner in which the invention may be carried out, the following examples are given. It is to be understood, however, that the examples are for the purpose of illustration and the invention is not to be regarded as limited to any of the specific reactants or conditions recited therein. Unless otherwise indicated, parts disclosed in the examples are parts by weight.

*Example I*

This example illustrates the operation of the process of the invention using an apparatus as in Figure I wherein the reactor is 18 feet of ⅜ inch stainless steel tubing, electrically heated.

A feed mixture was prepared by mixing 7.4 parts epichlorohydrin, 14.9 parts of 2,2-bis(4-hydroxyphenyl propane (epi to bis-phenol ratio of 1.22:1) and 37.3 parts of acetone. A second feed mixture was made up of 3.7 parts sodium hydroxide and 36.7 parts water. These two mixtures were passed through a packed section at a rate of about 1.2 feet per minute to effect a thorough mixing of the reactants and then continuously fed into the above-noted pipe reactor. The feed stream had a reactant concentration of 26% by weight and the acetone-water ratio was 1:1. The pipe reactor was maintained at a temperature of about 110° C. and the residence time was 15 minutes. The mixture recovered from the reaction was cooled to 55° C. and neutralized to a pH of 6.9 by the addition of sodium dihydrogen phosphate.

The neutralized mixture was heated to 60–63° C. and then taken to a phase separator where the mixture was allowed to separate into an organic layer and aqueous layer. The upper or organic layer (39.8% by weight) was made up of about 45.8% resin, 43.3% acetone, 9.8% water and traces of salt, sodium phosphates, glycerine, mesityl oxide and diacetone alcohol. The lower aqueous layer was composed of 58.9% water, 27.4% acetone, 7.6% sodium chloride, 0.2% resin, 3.7% sodium phosphates, and small amounts of mesityl oxide and diacetone alcohol.

The organic layer was stabilized at 150° C. and 5 mm. Hg for 10 minutes. The resulting resin was obtained in yield of 98 to 99%. The resin had a melting point of 103.5° C., color 3 (Gardner), molecular weight of 1450, viscosity Q— (Gardner-Holdt), phenolic OH, .0072 eq./100 g.

The resin prepared above was used to form a 40% dehydrated castor oil fatty acid ester, and this ester used in melamine formaldehyde white baking enamel. The results of these tests indicate that the resin was of good quality.

Example II

In this experiment, the apparatus used was similar to that in Figure I wherein the reactor was a steam-heated pipe reactor having a capacity of 300 cc. and consisting of six 4-foot passes of ⅜ inch stainless steel tubing inside a 4-inch diameter steam-heated shell.

A feed mixture was prepared by mixing 10.7 parts epichlorohydrin, 21.7 parts of bis-phenol (epi to bis-phenol ratio of 1.22:1) and 21.0 parts of acetone. A second feed mixture was made up of 5.3 parts sodium hydroxide and 41.3 parts water. These two mixtures were combined to form one homogeneous feed mixture. In this mixture, the reactant concentration was 38% by weight and the ratio of water to acetone was 1.96:1. This homogeneous mixture was fed into the reaction zone where it was maintained at 110° C. and pressure of 100 p.s.i.g. for a residence period of 15 minutes. From the reaction tube, the mixture was cooled to 55–60° C. and neutralized to a pH of 7.0.

After neutralization, the mixture was heated to 70° C. and was taken to a phase separator where the mixture was allowed to separate into an organic layer and an aqueous layer. The upper layer containing 67% resin and 4.2% water. The acetone in the lower layer was about 11.5%.

The organic layer was stabilized at 150° C. and 5 mm. Hg for 10 minutes. The resulting resin was obtained in yield of 99%. The resin had a phenolic OH eq./100 g. 0.011.

The resin prepared above is used to form 40% dehydrated castor oil fatty acid esters and these esters used in melamine formaldehyde white baking enamel. The results of the test indicated the resin produced above is of good quality.

Example III

Using the apparatus as in Example II, a run was made using the following conditions: 1.22:1 ratio of epichlorohydrin to bis-phenol, 1.4:1 ratio of water to acetone, 15% excess sodium hydroxide, 38% reactant concentration, pipe reactor temperature of 130° C. and 15 minute residence time. The reaction mixture was neutralized, cooled and separated as in Example II and the resin stabilized at 150° C. and 10 mm. Hg. The resulting product had a weight per epoxy value of 933, a molecular weight of 1260 and phenolic OH 0.038 eq./100 g.

The above resin was evaluated in formation of dehydrated castor oil esters as in Example I. The ester film prepared therefrom had good properties indicating the above resin was of high quality.

Example IV

Example II was repeated with the exception that the residence time was 12 minutes. A high quality resin is obtained.

Example V

Example II was repeated with the exception that the epichlorohydrin and the 2,2-bis(4-hydroxyphenyl)propane were combined in a ratio of 1.4:1, the temperature was 160° C. and the residence time 9.5 minutes. A high quality resin is obtained.

Example VI

Example II was repeated with the exception that the residence time was 4.8 minutes and the temperature was 160° C. A good quality resin is also obtained.

Example VII

This example illustrates the use of the processes of the invention in preparing a liquid glycidyl polyether of 2,2-bis(4-hydroxyphenyl)propane.

The apparatus used was similar to that shown in Figure II. The reactor was composed of fifteen twenty-foot lengths of steam-jacketed, one inch O.D. stainless steel tubing with return bends. Caustic was fed to each of the six stages and was mixed with the product flowing through the pipe by means of ⅜ inch diameter orifices. The injection points were at 30, 30, 40, 40, 60 and 100 feet along the reactor. Mixing in the pipe between stages is accomplished by velocity of the mixture (about 2 feet per second) in the pipe and by ½ inch diameter orifices located within the pipe at intervals of six to seven feet between the return bends.

A feed mixture was prepared by mixing epichlorohydrin and 2,2-bis(4-hydroxyphenyl)propane in a mol ratio of 10/1, acetone and water. The organic feed mixture contained 11.1% by weight of the phenol, 44.9% epichlorohydrin and 44.0% acetone. Water fed to the system both as process water and as 20% caustic as noted below was approximately 22% of the total feed. The mixture was passed through the reactor which was maintained at 110° C. with a 2.5 minute residence time. 20% aqueous caustic sodium hydroxide was introduced in equal proportions at six spaced orifices so as to introduce the 2.2 mol of alkali per mol of the phenol.

The brine phase was removed from the reaction mixture prior to the sixth reaction stage as shown in Figure II. The reaction mixture was cooled to 60–70° C. before the phase separation after the fifth stage addition.

The final mixture was then cooled at 60–70° C. and taken to the phase separator where mixture was allowed to separate into an organic layer and aqueous layer. The organic layer was then stabilized in a continuous two-stage stabilizer with the final conditions of 170° C. and 20 mm. Hg. The resulting product was a liquid resin having a molecular weight of 331, an epoxy value of 193, a viscosity of 157 poises, 25° C. and saponifiable chlorine 0.18% w. and phenolic OH 0.013 eq./100 g.

A portion of the resin was cured with 20 parts (per 100 parts of resin) of meta-phenylene diamine to form a hard tough casting indicating the resin was of good quality.

Example VIII

This example illustrates the use of the process of the invention in preparing a liquid grade glycidyl polyether of 2,2-bis(4-hydroxyphenyl)propane.

The apparatus used was similar to that shown in Figure II and described in the preceding example with the exception that the caustic was injected in 12 places instead of six. The additional points of injection are shown in the drawing as point 48, 49, 50, 51, 52 and 53.

A feed mixture was prepared by mixing epichlorohydrin and 2,2-bis(4-hydroxyphenyl)propane in a mole ratio of 10/1, acetone and water. The organic feed mixture contained 11.1% by weight of the phenol, 44.9% epichlorohydrin and 44.0% acetone. The water feed was 22% of the total feed as in the preceding example. The mixture was then taken to the pipe reactor which was maintained at 110° C. to 113° C. At twelve places spaced 15′, 15′, 15′, 15′, 20′, 20′, 20′, 20′, 30′, 30′, 40′ and 60′ respectively apart, 20% aqueous caustic was added. The residence time was 2.5 minutes. The brine phase removed prior to eleventh caustic injection as in the preceding example.

The mixture was then cooled to 60–70° C. and taken to the phase separator where mixture was allowed to separate into an organic layer and aqueous layer. The organic layer was then taken to a two-stage stabilization unit with the final condition of 170° C. and 20 mm. Hg. The resulting product was a liquid resin having a molecular weight of 354, and epoxy value of 192, a viscosity of 152 poises, 25° C. saponifiable chlorine 0.18% w., phenolic OH 0.004 eq./100 g.

A portion of the resin prepared by the above continuous process was heated with 20 parts (per 100 parts of resin) of a curing agent made up of an adduct of metaphenylene diamine and phenyl glycidyl ether for 2 hours at 80° C. followed by one hour at 200° C. The resulting casting was a strong hard product having heat distortion point of 147.5° C. This compares to average of 143 to 147° C. for the liquid resin prepared by the batch process.

*Example IX*

Example I was repeated with the exception that methyl ethyl ketone was used in place of the acetone. The reaction mixture had a composition as follows:

| | Percent by weight |
|---|---|
| Water | 41.2 |
| NaOH | 4.1 |
| Bis-phenol A | 17.2 |
| Methyl ethyl ketone | 29.2 |
| Epichlorohydrin | 8.3 |

The epichlorohydrin to bis-phenol A ratio was 1.2:1. The reaction temperature was 76° C. with slightly longer residence period like that in Example I. The resulting product was neutralized and taken to the phase separator as in Example I. The resulting resin was obtained in 99% yield and had an epoxide equivalent of 965. The resin was then used to form a 40% dehydrated castor oil fattey acid ester and this ester used in malamine formaldehyde white baked enamel. The results of these tests indicate that the resin was of good quality.

We claim as our invention:

1. A process for preparing glycidyl ethers of phenols which comprises forming a homogeneous mixture by continuously introducing an epoxy forming material of the group consisting of epichlorohydrin and glycerol chlorohydrin, also a phenol, an aliphatic ketone containing no more than 4 carbon atoms, and water which mixture contains the epichlorohydrin and phenol in a mol ratio varying from 1:1 to 25:1 into an elongated reaction zone where the mixture is mixed with an alkali metal hydroxide in at least an equivalent amount relative to the epoxy-forming material and the resulting mixture heated at a temperature above about 70° C. removing the reaction mixture to a phase separator, separating the organic phase and recovering the glycidyl polyether therefrom, the reaction mixture in the zone containing from 2.5% to about 41% water by weight at the start and from about 18% to about 40% by weight at the end of the zone and containing from 25% to 50% by weight of ketone.

2. A process for preparing solid glycidyl polyether of polyhydric phenols which comprises forming a homogeneous mixture containing epichlorohydrin, polyhydric phenol, acetone, alkali metal hydroxide and water which mixture contains the epichlorohydrin and polyhydric phenol in a mol ratio varying from 1:1 to 2:1 and contains from 2.5% to 30% water, from 25% to 50% by weight of acetone and from 1.2 to 2 mols of alkali metal hydroxide per mol of polyhydric phenol and, continuously passing this mixture into an elongated reaction zone which is maintained at a temperature between 95° C. and 180° C. for a residence time of 5 to 20 minutes, removing the reaction mixture to a phase separator where it separates into an organic layer and aqueous layer, removing the organic layer and recovering the glycidyl polyether therefrom.

3. A process as in claim 2 wherein the polyhydric phenol is 2,2-bis(4-hydroxyphenyl)propane.

4. A process as in claim 2 wherein the acetone makes up from 30% to 45% by weight of the feed mixture.

5. A process as in claim 2 wherein the epichlorohydrin and phenol are combined in a ratio of about 1:1 to about 1.5:1.

6. A process as in claim 2 wherein the temperature ranges from 110° C. to 160° C.

7. A process as in claim 2 wherein the reaction mixture is brought to a pH of 7–9 before being taken to the separator.

8. A process for preparing liquid grade glycidyl polyether of polyhydric phenols which comprises forming a feed mixture comprising an intimate mixture of epichlorohydrin, polyhydric phenol, acetone and water which mixture contains the epichlorohydrin and polyhydric phenol in a mol ratio varying from 3:1 to 25:1, from 25% to 50% by weight of acetone and from 2.5% to 30% by weight of water, continuously passing this mixture into an elongated reaction zone into which zone at a plurality of spaced intervals is being injected aqueous alkali metal hydroxide so as to furnish at least an equivalent amount of the hydroxide, and said zone being maintained at a temperature above about 95° C., removing the reaction mixture to a phase separator, separating the organic phase and recovering the glycidyl polyether therefrom.

9. A process as in claim 8 wherein the alkali metal hydroxide is introduced at 6 to 12 different places in the reaction zone.

10. A process as in claim 8 wherein the epichlorohydrin and polyhydric phenol are combined in a ratio varying from 10:1 to 15:1.

11. A process as in claim 8 wherein the alkali metal hydroxide is added in sufficient amount to furnish from 2.1 to 2.2 mol per mol of the polyhydric phenol.

12. A process as in claim 8 wherein the acetone makes up from 30% to 45% by weight of the feed mixture.

13. A process as in claim 8 wherein the temperature of the reaction zone varies from 95° C. to 160° C.

References Cited in the file of this patent

UNITED STATES PATENTS

| 2,616,872 | Bloem et al. | Nov. 4, 1952 |
| 2,642,412 | Newey et al. | June 16, 1953 |
| 2,801,227 | Goppel | July 30, 1957 |